(12) United States Patent
Sung et al.

(10) Patent No.: US 11,029,751 B2
(45) Date of Patent: Jun. 8, 2021

(54) ELECTRONIC SYSTEM CAPABLE OF SHARING PERIPHERAL DEVICE

(71) Applicant: QISDA CORPORATION, Taoyuan (TW)

(72) Inventors: Kuan-Lun Sung, Taoyuan (TW); Yen-Lin Chou, Taoyuan (TW); Wei-Jou Chen, Hsinchu County (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/409,846

(22) Filed: May 12, 2019

(65) Prior Publication Data

US 2019/0377422 A1    Dec. 12, 2019

(30) Foreign Application Priority Data

Jun. 7, 2018   (TW) .................................. 107119616

(51) Int. Cl.
| | |
|---|---|
| *G06F 3/01* | (2006.01) |
| *G06F 3/023* | (2006.01) |
| *G06F 3/02* | (2006.01) |
| *G06F 3/038* | (2013.01) |
| *G09G 5/00* | (2006.01) |
| *G06F 3/14* | (2006.01) |

(52) U.S. Cl.
CPC ................ *G06F 3/01* (2013.01); *G06F 3/023* (2013.01); *G06F 3/0227* (2013.01); *G06F 3/038* (2013.01); *G06F 3/1454* (2013.01); *G09G 5/006* (2013.01); *G06F 2203/0383* (2013.01); *G09G 2370/04* (2013.01); *G09G 2370/24* (2013.01)

(58) Field of Classification Search
CPC ........ G06F 3/023; G06F 3/1454; G06F 3/038; G06F 3/0227; G06F 2203/0382; G06F 2203/0383; G06F 2203/0384; G09G 5/006; G09G 5/14; G09G 2370/24; G09G 2370/04; G09G 2370/20
USPC .......................................................... 345/168
See application file for complete search history.

(56) References Cited

U.S. PATENT DOCUMENTS

| | | | |
|---|---|---|---|
| 10,142,581 B2 * | 11/2018 | Lee ........................... | G06F 3/14 |
| 2001/0054092 A1 * | 12/2001 | Vaha-Sipila .......... | G06F 3/0231 |
| | | | 709/223 |

(Continued)

FOREIGN PATENT DOCUMENTS

| | | |
|---|---|---|
| TW | 201329716 A1 | 7/2013 |
| TW | 201502787 A | 1/2015 |
| TW | 201537350 A | 10/2015 |

*Primary Examiner* — Jason M Mandeville (57) ABSTRACT

An electronic system capable of sharing peripheral device includes a display device, a first host device, at least one peripheral device and a second host device. The first host device communicates with the display device, outputs a first picture to the display device and transmits a link information to the display device. The peripheral device is connected to the first host device. The second host device communicates with the display device, outputs a second picture to the display device and obtains the link information and a picture arrangement manner from the display device. The first host device obtains the picture arrangement manner from the display device. The second host device establishes a link with the first host device through an Internet according to the link information, such that the peripheral device is allowed to control the second host device through the first host device and the Internet.

3 Claims, 7 Drawing Sheets

(56) References Cited

U.S. PATENT DOCUMENTS

| | | | | |
|---|---|---|---|---|
| 2003/0001966 A1* | 1/2003 | Matsubara | ............... | G06F 3/14 |
| | | | | 348/553 |
| 2007/0283157 A1* | 12/2007 | Yami | ................... | H04L 9/0844 |
| | | | | 713/175 |
| 2016/0195897 A1* | 7/2016 | Robinson | ............. | G06F 1/1632 |
| | | | | 710/304 |
| 2018/0091758 A1* | 3/2018 | Lee | ...................... | G06F 1/1694 |

* cited by examiner

ELECTRONIC SYSTEM CAPABLE OF SHARING PERIPHERAL DEVICE

BACKGROUND OF THE INVENTION

1. Field of the Invention

The invention relates to an electronic system capable of sharing peripheral device and, more particularly, to an electronic system allowing a plurality of host devices to establish a link automatically and then share peripheral device with each other.

2. Description of the Prior Art

A KVM (Keyboard Video Mouse) switch is a computer hardware allowing a user to use one set of keyboard, monitor, mouse, etc. to control a plurality of computers. In the prior art, when a user wants to enable a plurality of computers to share peripheral device or transmit data with each other, the user has to perform relative setting in the computers manually (e.g. operating a computer to input an Internet protocol (IP) address and an open port information of another computer), so as to establish a link between the computers. The aforesaid manual setting manner is complicated and inefficient. If the user is not familiar with computer operation, it may trouble the user with the aforesaid setting.

SUMMARY OF THE INVENTION

An objective of the invention is to provide an electronic system allowing a plurality of host devices to establish a link automatically and then share peripheral device with each other, so as to solve the aforesaid problem.

According to an embodiment of the invention, an electronic system capable of sharing peripheral device comprises a display device, a first host device, at least one peripheral device, and a second host device. The first host device communicates with the display device and outputs a first picture to the display device. The first host device transmits a link information to the display device. The at least one peripheral device is connected to the first host device. The second host device communicates with the display device and outputs a second picture to the display device. The display device arranges the first picture and the second picture according to a picture arrangement manner. The second host device obtains the link information and the picture arrangement manner from the display device. The first host device obtains the picture arrangement manner from the display device. The second host device establishes a link with the first host device through an Internet according to the link information, such that the at least one peripheral device is allowed to control the second host device through the first host device and the Internet.

According to another embodiment of the invention, an electronic system capable of sharing peripheral device comprises a display device, a first host device, at least one peripheral device, and a second host device. The first host device communicates with the display device and outputs a first picture to the display device. The first host device obtains an identification information from the display device. The at least one peripheral device is connected to the first host device. The second host device communicates with the display device and outputs a second picture to the display device. The display device arranges the first picture and the second picture according to a picture arrangement manner. The second host device obtains the identification information and the picture arrangement manner from the display device. The first host device obtains the picture arrangement manner from the display device. The second host device broadcasts the identification information and an Internet protocol address of the second host device through an Internet. When the first host device receives the identification information and the Internet protocol address of the second host device through the Internet, the first host device transmits a link information to the second host device through the Internet according to the Internet protocol address of the second host device. The second host device establishes a link with the first host device through the Internet according to the link information, such that the at least one peripheral device is allowed to control the second host device through the first host device and the Internet.

According to another embodiment of the invention, an electronic system capable of sharing peripheral device comprises a display device, a first host device, at least one peripheral device, and a second host device. The first host device communicates with the display device and outputs a first picture to the display device. The at least one peripheral device is connected to the first host device. The second host device communicates with the display device and outputs a second picture to the display device. The display device arranges the first picture and the second picture according to a picture arrangement manner. The first host device and the second host device obtain the picture arrangement manner from the display device. The second host device transmits a request message to the first host device through the display device and the first host device transmits a response message to the second host device through the display device, such that the first host device and the second host device establish a link with each other through the display device and then the at least one peripheral device is allowed to control the second host device through the first host device and the display device.

As mentioned in the above, after a user makes a plurality of host devices communicate with the display device, the plurality of host devices are capable of establishing a link with each other through the Internet or the display device automatically, so as to enable the plurality of host devices to share the peripheral device. Accordingly, the invention can avoid the aforesaid complicated manual setting manner of the prior art. Therefore, the invention is very convenient and efficient for the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
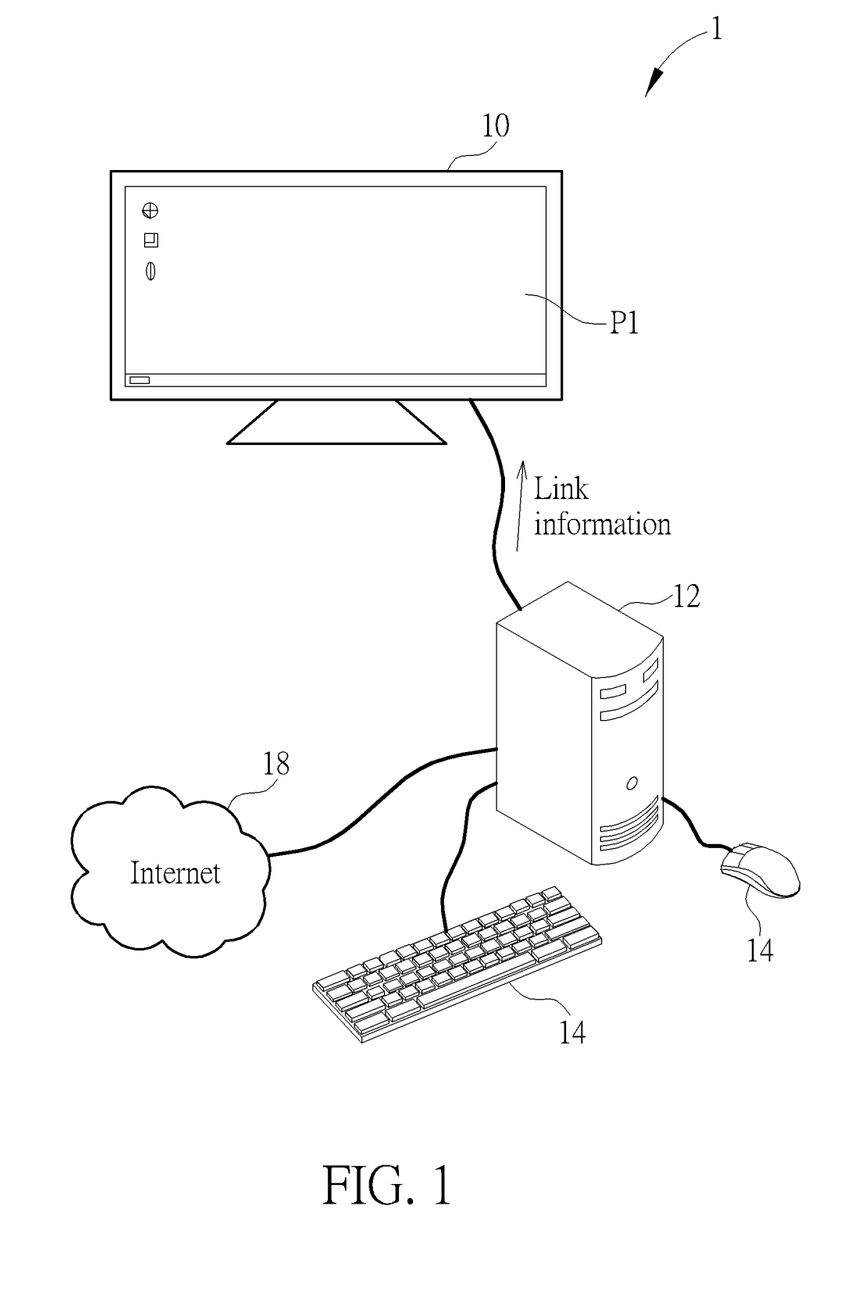
FIG. 1 is a schematic diagram illustrating an electronic system capable of sharing peripheral device according to an embodiment of the invention.
Figure 2:
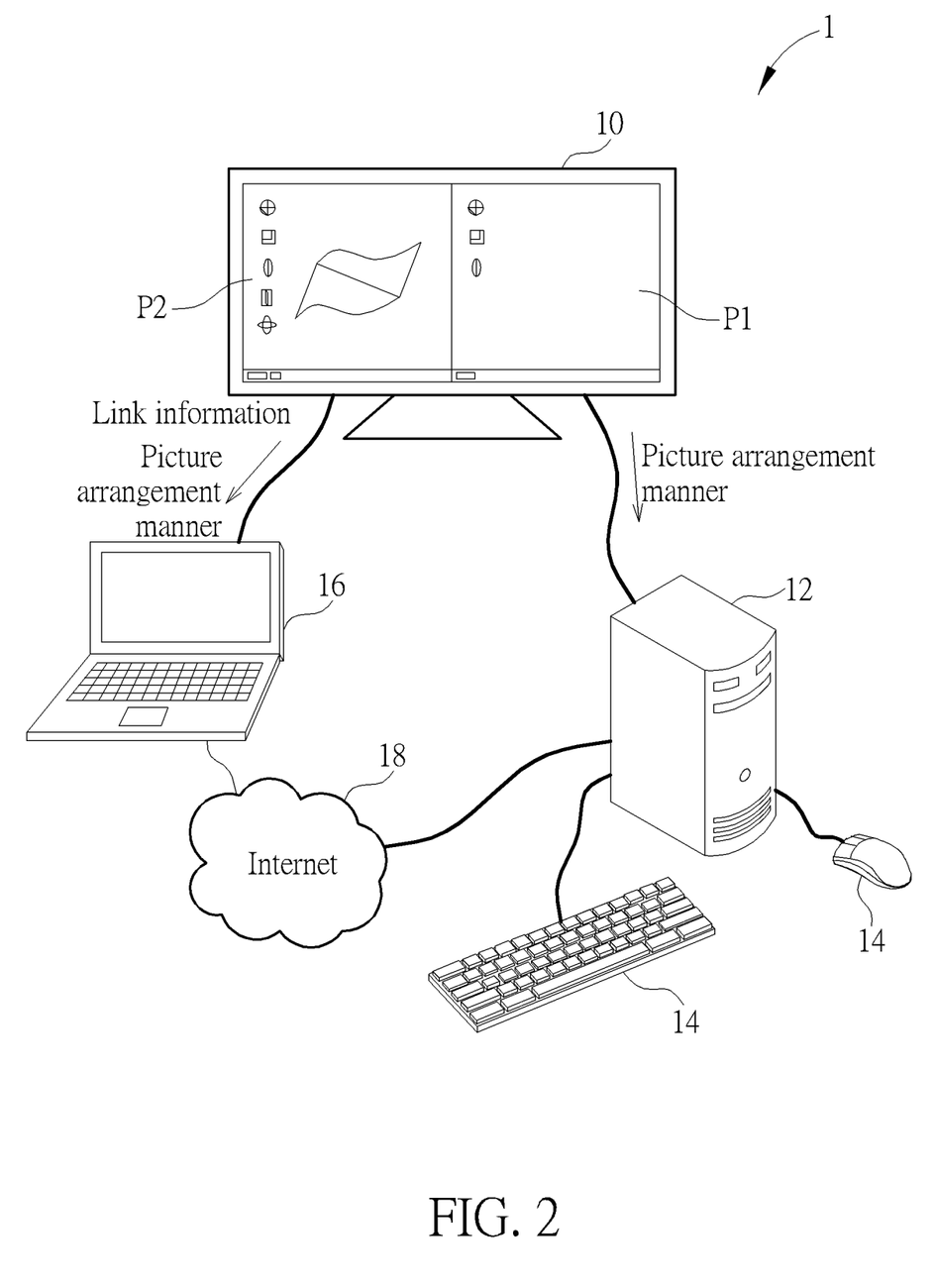
FIG. 2 is a schematic diagram illustrating a second host device communicating with the display device shown in FIG. 1.

Referring to FIGS. 1 and 2, FIG. 1 is a schematic diagram illustrating an electronic system 1 capable of sharing peripheral device according to an embodiment of the invention and FIG. 2 is a schematic diagram illustrating a second host device 16 communicating with the display device 10 shown in FIG. 1.

As shown in FIGS. 1 and 2, the electronic system 1 capable of sharing peripheral device comprises a display device 10, a first host device 12, at least one peripheral device 14, and a second host device 16. In this embodiment, the display device 10 may be a computer monitor, a television, or other display devices; the first host device 12 and the second host device 16 may be personal computers, notebook computers, tablet computers, or other host devices with data processing function; the peripheral device 14 may be a keyboard, a mouse, or other input devices.

In this embodiment, the peripheral device 14 is connected to the first host device 12, wherein the number and type of the peripheral device 14 may be determined according to practical applications, so the invention is not limited to the embodiment shown in the figures. The first host device 12 may be connected to the display device 10 by a cable, so as to communicate with the display device 10 in a wired manner. Furthermore, the first host device 12 may also communicate with the display device 10 in a wireless manner by Wi-Fi, Bluetooth, or other wireless communication modules.

As shown in FIG. 1, when the first host device 12 communicates with the display device 10, the first host device 12 may output a first picture P1 to the display device 10. Furthermore, a KVM application is installed in the first host device 12. When the first host device 12 communicates with the display device 10, the KVM application of the first host device 12 transmits a link information to the display device 10. In this embodiment, the link information may comprise an Internet protocol (IP) address and an open port information of the first host device 12, and the open port information may comprise a serial number and a communication protocol (e.g. TCP/IP, UDP, etc.) of at least one port. When the first host device 12 communicates with the display device 10 in a wired manner, the KVM application of the first host device 12 may transmit the link information to the display device 10 through a display data channel command interface (DDC/CI), but is not so limited. When the display device 10 receives the link information of the first host device 12, the display device 10 may store the link information of the first host device 12 in a memory or other data storage devices.

When a user wants to enable the second host device 16 to share the peripheral device 14 connected to the first host device 12, the user may make the second host device 16 communicate with the display device 10, as shown in FIG. 2. The second host device 16 may be connected to the display device 10 by a cable, so as to communicate with the display device 10 in a wired manner. Furthermore, the second host device 16 may also communicate with the display device 10 in a wireless manner by Wi-Fi, Bluetooth, or other wireless communication modules.

When the second host device 16 communicates with the display device 10, the second host device 16 may output a second picture P2 to the display device 10. Then, the display device 10 arranges the first picture P1 and the second picture P2 according to a picture arrangement manner, wherein the picture arrangement manner may be picture by picture (PBP), picture in picture (PIP), or other manners. The picture arrangement manner of the first picture P1 and the second picture P2 shown in FIG. 2 is picture by picture, but is not so limited. It should be noted that the picture arrangement manner may be system default or defined by the user according to practical applications.

Still further, the KVM application is also installed in the second host device 16. When the second host device 16 communicates with the display device 10, the KVM application of the second host device 16 obtains the link information of the first host device 12 and the aforesaid picture arrangement manner from the display device 10. When the second host device 16 communicates with the display device 10 in a wired manner, the KVM application of the second host device 16 may obtain the link information of the first host device 12 and the aforesaid picture arrangement manner from the display device 10 through a display data channel command interface (DDC/CI), but is not so limited. Moreover, the KVM application of the first host device 12 also obtains the aforesaid picture arrangement manner from the display device 10.

In this embodiment, the first host device 12 and the second host device 16 may further communicate with an Internet 18 (e.g. local area network (LAN) or wireless LAN (WLAN)) in a wired or wireless manner. Accordingly, when the KVM application of the second host device 16 obtains the link information of the first host device 12 from the display device 10, the second host device 16 may pair and establish a link with the first host device 12 through the Internet 18 according to the link information. After the second host device 16 establishes the link with the first host device 12 through the Internet 18, the peripheral device 14 is allowed to be operated by the user to control the second host device 16 through the first host device 12 and the Internet 18. Accordingly, the first host device 12 and the second host device 16 can share the peripheral device 14 and transmit data with each other.

Figure 3:
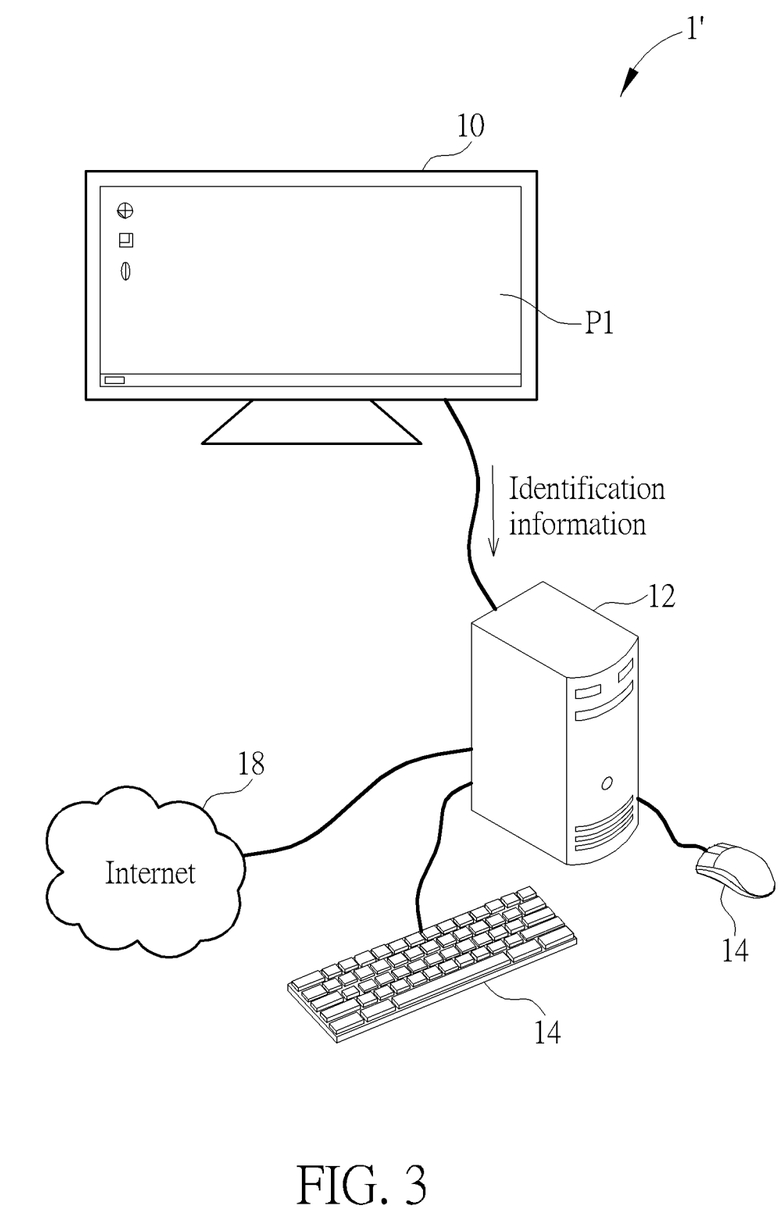
FIG. 3 is a schematic diagram illustrating an electronic system capable of sharing peripheral device according to another embodiment of the invention.
Figure 4:
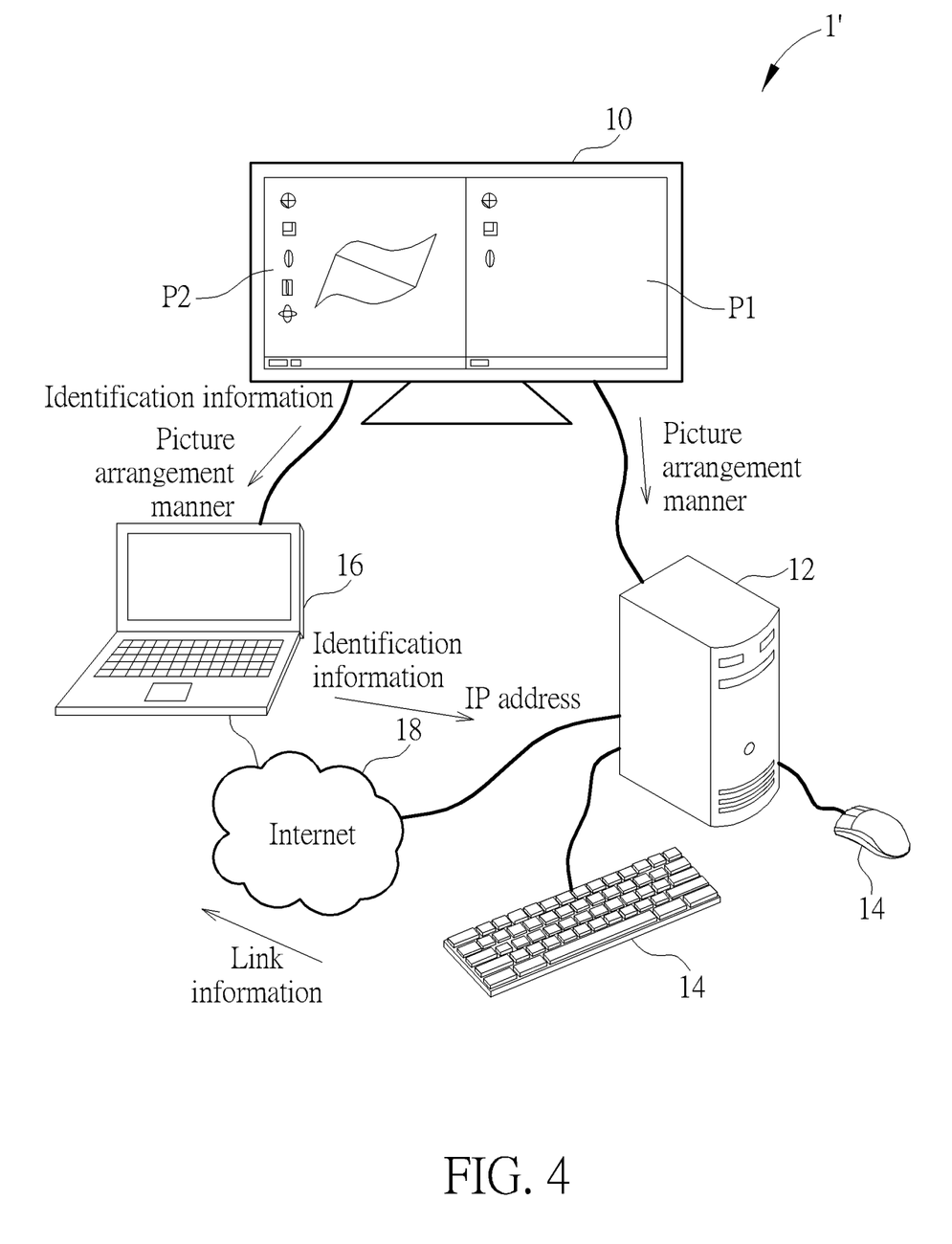
FIG. 4 is a schematic diagram illustrating a second host device communicating with the display device shown in FIG. 3.

Referring to FIGS. 3 and 4, FIG. 3 is a schematic diagram illustrating an electronic system 1' capable of sharing peripheral device according to another embodiment of the invention and FIG. 4 is a schematic diagram illustrating a second host device 16 communicating with the display device 10 shown in FIG. 3. The main difference between the electronic system 1' and the aforesaid electronic system 1 is that the manner of establishing the link between the second host device 16 and the first host device 12, and that will be depicted in detail below.

As shown in FIG. 3, when the first host device 12 communicates with the display device 10, the first host device 12 may output a first picture P1 to the display device 10 and the KVM application of the first host device 12 obtains an identification information from the display device 10. In this embodiment, the identification information may be, but not limited to, a serial number of the display device 10. When the first host device 12 communicates with the display device 10 in a wired manner, the KVM application of the first host device 12 may obtain the identification information from the display device 10 through a display data channel command interface (DDC/CI), but is not so limited.

When a user wants to enable the second host device 16 to share the peripheral device 14 connected to the first host device 12, the user may make the second host device 16 communicate with the display device 10, as shown in FIG. 4. When the second host device 16 communicates with the display device 10, the second host device 16 may output a second picture P2 to the display device 10. Then, the display device 10 arranges the first picture P1 and the second picture P2 according to a picture arrangement manner, wherein the picture arrangement manner may be picture by picture (PBP), picture in picture (PIP), or other manners. The picture arrangement manner of the first picture P1 and the second picture P2 shown in FIG. 4 is picture by picture, but is not so limited. It should be noted that the picture arrangement manner may be system default or defined by the user according to practical applications.

Still further, when the second host device 16 communicates with the display device 10, the KVM application of the second host device 16 obtains the aforesaid identification information and the aforesaid picture arrangement manner from the display device 10. When the second host device 16 communicates with the display device 10 in a wired manner, the KVM application of the second host device 16 may obtain the aforesaid identification information and the aforesaid picture arrangement manner from the display device 10 through a display data channel command interface (DDC/CI), but is not so limited. Moreover, the KVM application of the first host device 12 also obtains the aforesaid picture arrangement manner from the display device 10.

In this embodiment, the first host device 12 and the second host device 16 may further communicate with an Internet 18 (e.g. LAN or WLAN) in a wired or wireless manner. Accordingly, when the KVM application of the second host device 16 obtains the identification information from the display device 10, the KVM application of the second host device 16 may broadcast the identification information and an IP address of the second host device 16 through the Internet 18. When the KVM application of the first host device 12 receives the identification information and the IP address of the second host device 16 through the Internet 18, the KVM application of the first host device 12 transmits a link information to the second host device 16 through the Internet 18 according to the IP address of the second host device 16. In this embodiment, the link information may comprise an IP address and an open port information of the first host device 12, and the open port information may comprise a serial number and a communication protocol (e.g. TCP/IP, UDP, etc.) of at least one port.

When the KVM application of the second host device 16 obtains the link information of the first host device 12 through the Internet 18, the KVM application of the second host device 16 may pair and establish a link with the first host device 12 through the Internet 18 according to the link information. After the second host device 16 establishes the link with the first host device 12 through the Internet 18, the peripheral device 14 is allowed to be operated by the user to control the second host device 16 through the first host device 12 and the Internet 18. Accordingly, the first host device 12 and the second host device 16 can share the peripheral device 14 and transmit data with each other.

Figure 5:
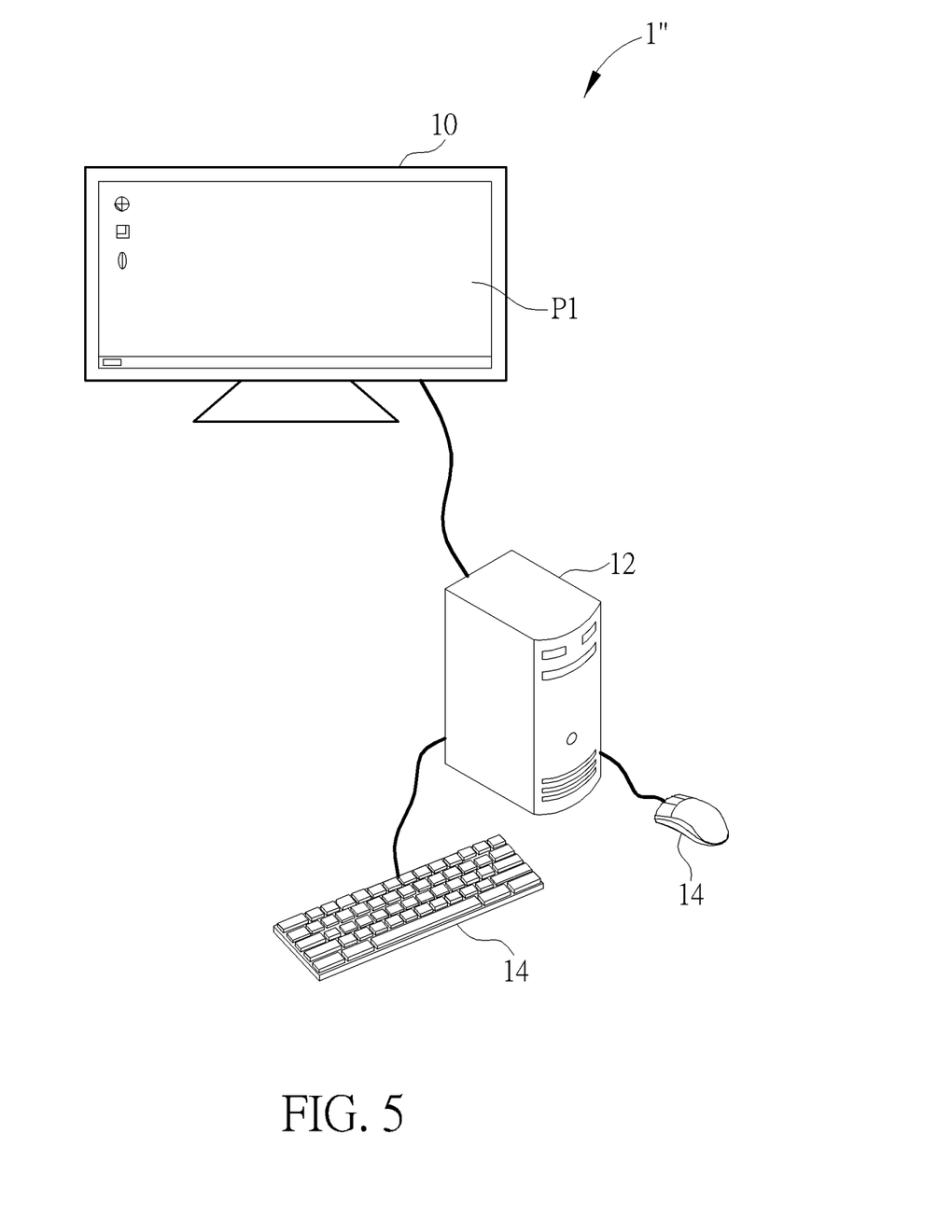
FIG. 5 is a schematic diagram illustrating an electronic system capable of sharing peripheral device according to another embodiment of the invention.
Figure 6:
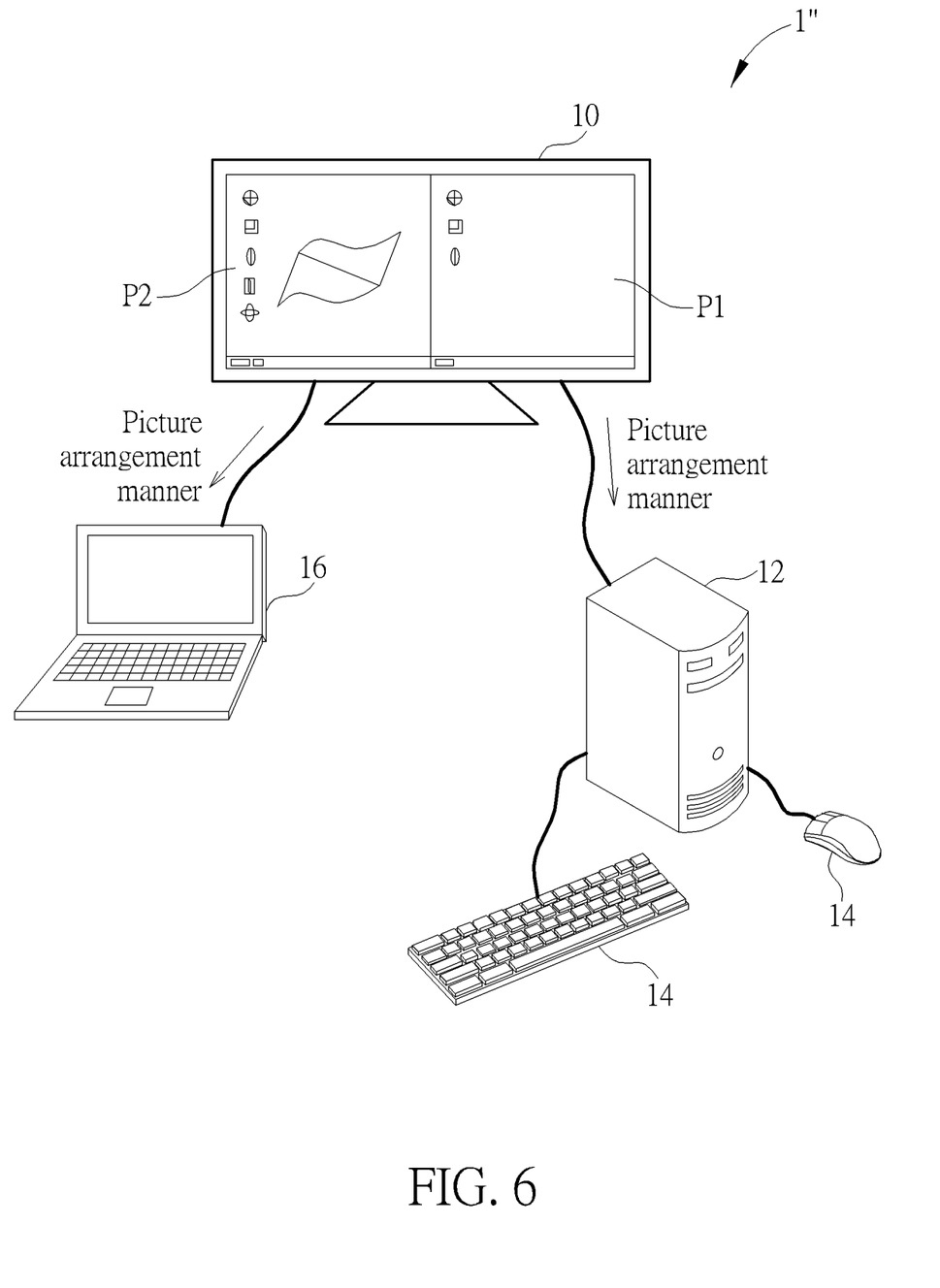
FIG. 6 is a schematic diagram illustrating a second host device communicating with the display device shown in FIG. 5.
Figure 7:
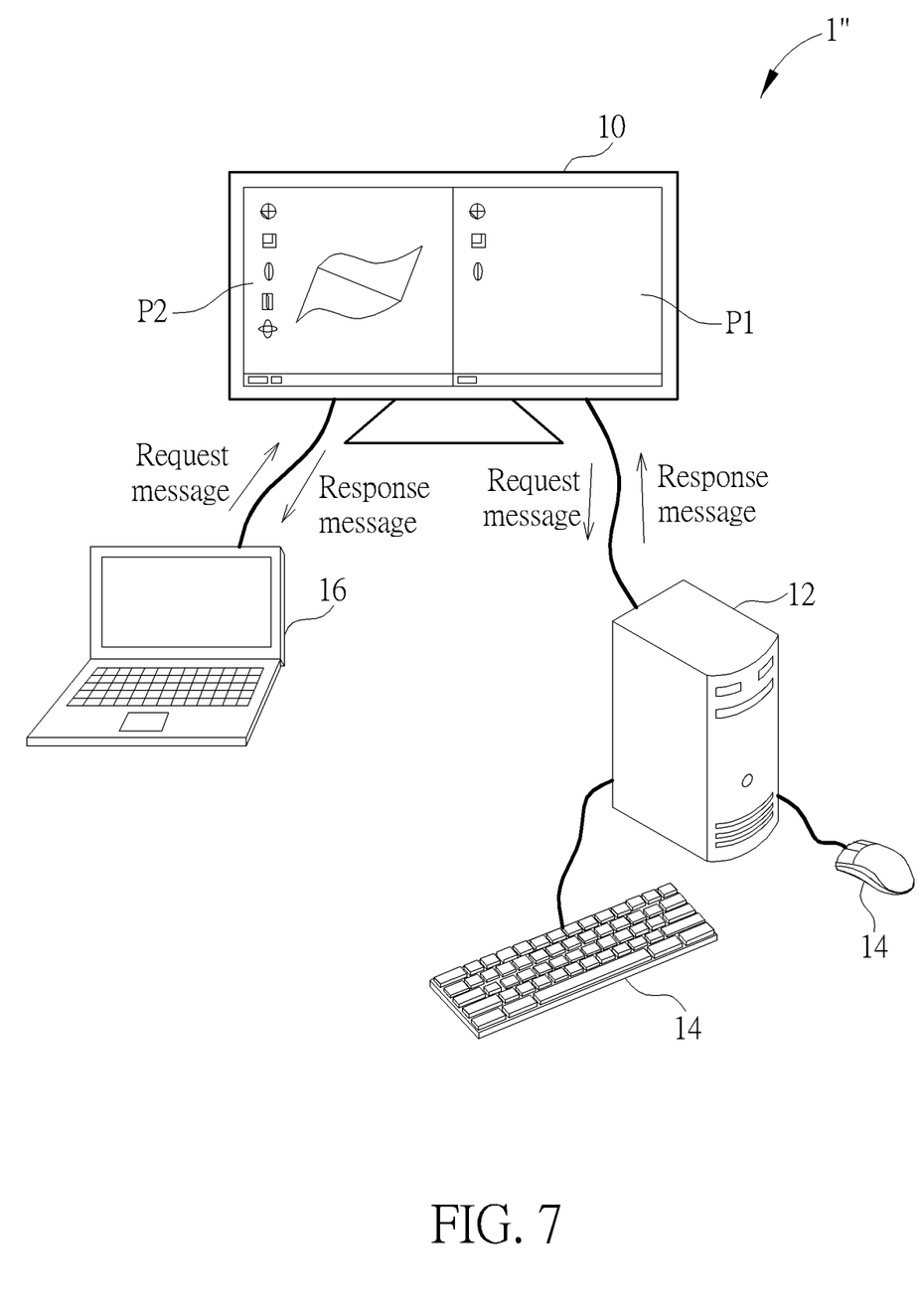
FIG. 7 is a schematic diagram illustrating the second host device and the first host device shown in FIG. 6 transmitting a request message and a response message with each other.

Referring to FIGS. 5 to 7, FIG. 5 is a schematic diagram illustrating an electronic system 1" capable of sharing peripheral device according to another embodiment of the invention, FIG. 6 is a schematic diagram illustrating a second host device 16 communicating with the display device 10 shown in FIG. 5, and FIG. 7 is a schematic diagram illustrating the second host device 16 and the first host device 12 shown in FIG. 6 transmitting a request message and a response message with each other. The main difference between the electronic system 1" and the aforesaid electronic systems 1, 1' is that the manner of establishing the link between the second host device 16 and the first host device 12, and that will be depicted in detail below.

As shown in FIG. 5, when the first host device 12 communicates with the display device 10, the first host device 12 may output a first picture P1 to the display device 10. When a user wants to enable the second host device 16 to share the peripheral device 14 connected to the first host device 12, the user may make the second host device 16 communicate with the display device 10, as shown in FIG. 6. When the second host device 16 communicates with the display device 10, the second host device 16 may output a second picture P2 to the display device 10. Then, the display device 10 arranges the first picture P1 and the second picture P2 according to a picture arrangement manner, wherein the picture arrangement manner may be picture by picture (PBP), picture in picture (PIP), or other manners. The picture arrangement manner of the first picture P1 and the second picture P2 shown in FIG. 6 is picture by picture, but is not so limited. It should be noted that the picture arrangement manner may be system default or defined by the user according to practical applications. Furthermore, the KVM application of the first host device 12 and the KVM application of the second host device 16 obtain the aforesaid picture arrangement manner from the display device 10.

Then, as shown in FIG. 7, the KVM application of the second host device 16 may transmit a request message to the first host device 12 through the display device 10. When the KVM application of the first host device 12 receives the request message, the KVM application of the first host device 12 may transmit a response message to the second host device 16 through the display device 10, such that the first host device 12 and the second host device 16 establish a link with each other through the display device 10. After the second host device 16 establishes the link with the first host device 12 through the display device 10, the peripheral device 14 is allowed to be operated by the user to control the second host device 16 through the first host device 12 and the display device 10. Accordingly, the first host device 12 and the second host device 16 can share the peripheral device 14 and transmit data with each other.

As mentioned in the above, after a user makes a plurality of host devices communicate with the display device, the plurality of host devices are capable of establishing a link with each other through the Internet or the display device automatically, so as to enable the plurality of host devices to share the peripheral device. Accordingly, the invention can avoid the aforesaid complicated manual setting manner of the prior art. Therefore, the invention is very convenient and efficient for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic system capable of sharing peripheral device comprising:
   a display device;

a first host device connected to the display device by a first cable, the first host device communicating with the display device and outputting a first picture to the display device, the first host device transmitting a link information to the display device through the first cable;

at least one peripheral device connected to the first host device; and a second host device connected to the display device by a second cable, the second host communicating with the display device and outputting a second picture to the display device, the display device arranging the first picture and the second picture according to a picture arrangement manner, the second host device obtaining the link information and the picture arrangement manner from the display device through the second cable, the first host device obtaining the picture arrangement manner from the display device;

wherein the second host device establishes a link with the first host device through a network without the first and second cables according to the link information, such that the at least one peripheral device is allowed to control the second host device through the first host device and the network.

2. The electronic system of claim 1, wherein the link information comprises an Internet protocol address and an open port information of the first host device.

3. The electronic system of claim 2, wherein the open port information comprises a serial number and a communication protocol of at least one port.

\* \* \* \* \*